United States Patent
Oh

(10) Patent No.: US 8,040,072 B2
(45) Date of Patent: Oct. 18, 2011

(54) POWER SUPPLY AND PLASMA DISPLAY INCLUDING THE SAME

(75) Inventor: Kwan-Il Oh, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 702 days.

(21) Appl. No.: 12/222,155

(22) Filed: Aug. 4, 2008

(65) Prior Publication Data

US 2009/0039787 A1    Feb. 12, 2009

(30) Foreign Application Priority Data

Aug. 7, 2007   (KR) .................. 10-2007-0079032

(51) Int. Cl.
*H05B 41/16* (2006.01)
(52) U.S. Cl. ..... 315/247; 315/291; 315/307; 315/185 S; 315/274
(58) Field of Classification Search .................. 315/247, 315/291, 307–312, 185 S, 274–282, 149–158
See application file for complete search history.

(56) References Cited

U.S. PATENT DOCUMENTS

| | | | |
|---|---|---|---|
| 6,160,720 A | 12/2000 | Nishida et al. | |
| 6,320,763 B2 | 11/2001 | Hosotani | |
| 6,433,443 B2 | 8/2002 | Nishida et al. | |
| 6,954,186 B2 | 10/2005 | Ide et al. | |
| 2006/0232506 A1 | 10/2006 | Jeong | |
| 2007/0080903 A1 | 4/2007 | Lee | |
| 2008/0174582 A1 | 7/2008 | Kim | |

FOREIGN PATENT DOCUMENTS

| | | |
|---|---|---|
| EP | 1 942 484 A1 | 7/2008 |
| JP | 07-036555 A | 2/1995 |
| JP | 08-263151 | 10/1996 |
| JP | 2000-278946 A | 10/2000 |
| JP | 2001-037219 A | 2/2001 |
| JP | 2001-197740 A | 7/2001 |
| JP | 2001-197741 A | 7/2001 |
| JP | 2003-015593 A | 1/2003 |
| JP | 3098465 U | 3/2004 |
| JP | 2004-328948 A | 11/2004 |
| JP | 2006-293272 A | 10/2006 |
| JP | 2007-014128 A | 1/2007 |
| KR | 10-2005-0049671 A | 5/2005 |
| KR | 10-2005-0104218 A | 11/2005 |
| KR | 10-2006-0108818 A | 10/2006 |

*Primary Examiner* — Tuyet Thi Vo
(74) *Attorney, Agent, or Firm* — Lee & Morse, P.C.

(57) ABSTRACT

A power supply including a transformer primary coil coupled to an input power source and a secondary coil coupled to an output terminal, a first switch coupled to the primary coil of the transformer, a duty cycle of the first switch controlling a voltage of the output terminal, first and second resistors coupled to the output terminal in series, a third resistor having a first terminal coupled to a node common to the output terminal and the first resistor, a second switch having a first terminal coupled to a second terminal of the third resistor and having a second terminal coupled to a node common to the first and second resistors, the second switch controlled based on an accumulated driving time, and a switching controller configured to receive a feedback voltage varying according to an on/off of the second switch, and configured to control the duty cycle.

21 Claims, 4 Drawing Sheets

POWER SUPPLY AND PLASMA DISPLAY INCLUDING THE SAME

BACKGROUND OF THE INVENTION

1. Field of the Invention

Embodiments relate to a power supply and a plasma display including the power supply.

2. Description of the Related Art

A plasma display panel (PDP) is a flat panel display that uses plasma generated by gas discharge to display characters or images. It may include, depending on its size, several scores of pixels to millions of pixels arranged in a matrix pattern. One frame (1 TV field) of such a plasma display may be divided into a plurality of subfields having weight values, and each subfield may include a reset period, an address period, and a sustain period.

In the reset period, the status of each discharge cell may be initialized to facilitate an addressing operation in the discharge cell. In the address period, an addressing operation may be performed to select turn-on/turn-off cells, i.e., cells to be turned on or turned off. In the sustain period, a discharge operation may be performed to display characters or images based on the addressed cells. As the driving time of a plasma display accumulates, i.e., increases, characteristics of a magnesium oxide (MgO) layer in the PDP may change such that a discharge delay, i.e., a delay between application of a discharge voltage and the occurrence of the resulting discharge, is unduly increased.

The above information disclosed in this Background section is only for enhancement of understanding of the background of the invention, and is not provided as prior art.

SUMMARY OF THE INVENTION

Embodiments are therefore directed to a power supply and a plasma display including the power supply, which substantially overcome one or more of the problems due to the limitations and disadvantages of the related art.

It is therefore a feature of an embodiment to provide a power supply having a DC-DC converter configured to control a voltage level output based on a control signal provided by a PDP controller.

It is therefore another feature of an embodiment to provide a PDP having a controller configured to determine a driving time of the PDP and output a control signal to a power supply so as to control a voltage level output by the power supply.

At least one of the above and other features and advantages may be realized by providing a power supply for a plasma display panel (PDP), the power supply including a transformer including a primary coil coupled to an input power source and a secondary coil coupled to an output terminal, a first switch coupled to the primary coil of the transformer, a duty cycle of the first switch controlling a voltage of the output terminal, first and second resistors coupled to the output terminal in series, a third resistor having a first terminal coupled to a node common to the output terminal and the first resistor, a second switch having a first terminal coupled to a second terminal of the third resistor and having a second terminal coupled to a node common to the first and second resistors, the second switch being controlled based on an accumulated driving time of the PDP, and a switching controller configured to receive a feedback voltage that varies according to an on/off state of the second switch, and configured to control the duty cycle of the first switch.

The first and third resistors may be coupled in parallel when the second switch is turned on, and no current may flow through the third resistor when the second switch is turned off. The power supply may further include a shunt regulator having a reference terminal coupled to a node common to the first and second resistors and having an anode terminal coupled to ground, a photo diode having a cathode terminal coupled to the output terminal and having an anode terminal coupled to a cathode terminal of the shunt regulator, a photo transistor optically coupled to the photo diode, and a capacitor coupled in parallel to the photo diode or the photo transistor, the capacitor being charged with the feedback voltage. The second switch may be a photo coupler.

At least one of the first and second resistors may be a variable resistor having a resistance value that varies according to temperature. The temperature may correspond to the temperature of the PDP or the ambient temperature of the PDP. The first resistor may have a resistance value that increases as the temperature increases. The first resistor may have a resistance value that increases as the temperature decreases. The second resistor may have a resistance value that increases as the temperature decreases. The second resistor may have a resistance value that increases as the temperature increases.

At least one of the above and other features and advantages may also be realized by providing a plasma display, including a plasma display panel (PDP) including first and second electrodes, and a discharge cell at an intersection of the first and second electrodes, a driver configured to drive at least one of the first and second electrodes, a power supply configured to provide a voltage to the driver, and a controller configured to accumulate a driving time of the PDP and control a voltage output by the power supply according to the accumulated driving time. The power supply may include a transformer including a primary coil coupled to an input power source and a secondary coil coupled to an output terminal, a first switch coupled to the primary coil of the transformer, a duty cycle of the first switch controlling a voltage of the output terminal, first and second resistors coupled to the output terminal in series, a third resistor having a first terminal coupled to a node common to the output terminal and the first resistor, a second switch having a first terminal coupled to a second terminal of the third resistor and having a second terminal coupled to a node common to the first and second resistors, the second switch being controlled based on an accumulated driving time of the PDP, and a switching controller configured to receive a feedback voltage that varies according to an on/off state of the second switch, and configured to control the duty cycle of the first switch.

The controller may output a control signal for turning off the second switch when the accumulated driving time is less than a predetermined reference time, and may output a control signal for turning on the second switch when the accumulated driving time is greater than the reference time. The first and third resistors may be coupled in parallel when the second switch is turned on, and no current may flow through the third resistor when the second switch is turned off.

The plasma display may further include a shunt regulator having a reference terminal coupled to a node common to the first and second resistors and having an anode terminal coupled to ground, a photo diode having a cathode terminal coupled to the output terminal and having an anode terminal coupled to a cathode terminal of the shunt regulator, a photo transistor optically coupled to the photo diode, and a capacitor coupled in parallel to the photo diode or the photo transistor, the capacitor being charged with the feedback voltage. The second switch may be a photo coupler.

At least one of the first and second resistors may be a variable resistor having a resistance value that varies according to temperature. The temperature may correspond to the temperature of the PDP or the ambient temperature of the PDP. The first resistor may have a resistance value that increases as the temperature increases. The first resistor may have a resistance value that increases as the temperature decreases. The second resistor may have a resistance value that increases as the temperature decreases. The second resistor may have a resistance value that increases as the temperature increases.

BRIEF DESCRIPTION OF THE DRAWINGS

The above and other features and advantages will become more apparent to those of ordinary skill in the art by describing in detail example embodiments thereof with reference to the attached drawings, in which.

DETAILED DESCRIPTION OF THE INVENTION

Figure 1:
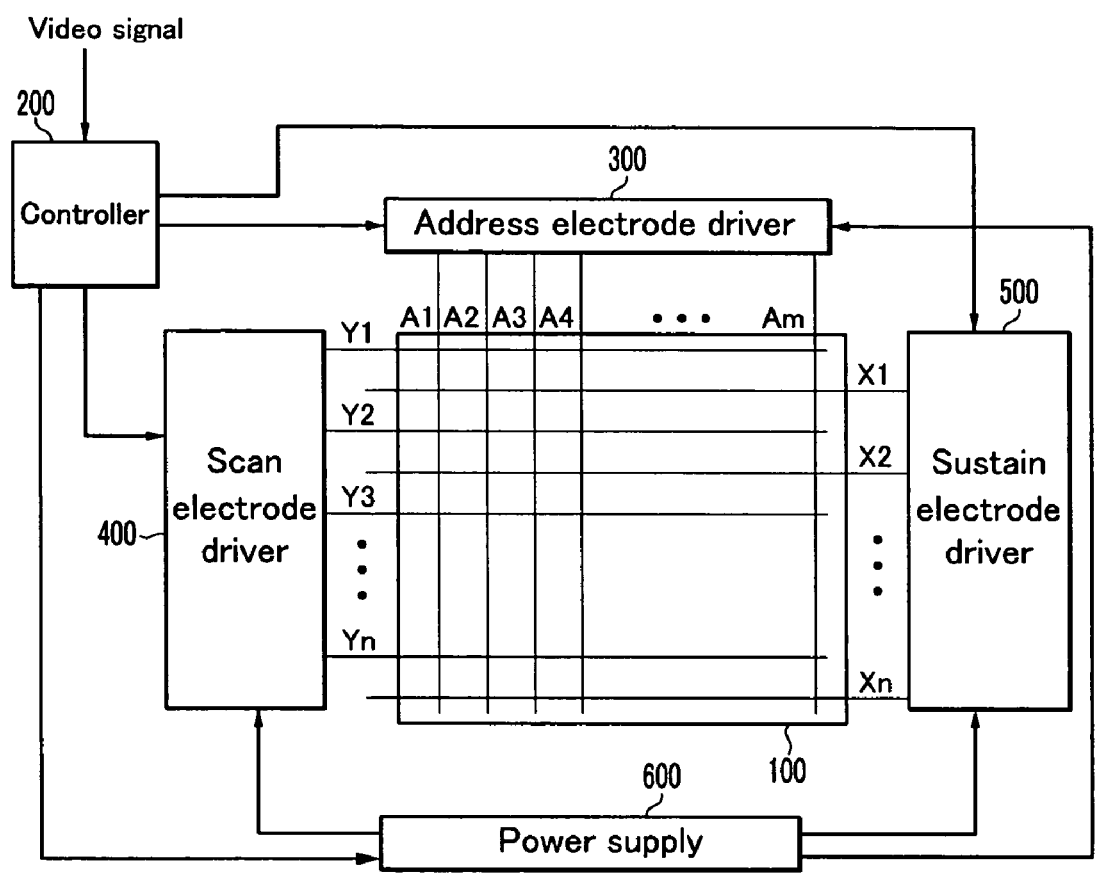
FIG. 1 illustrates a schematic view of a plasma display having a power supply according to an example embodiment.

Korean Patent Application No. 10-2007-0079032, filed on Aug. 7, 2007, in the Korean Intellectual Property Office, and entitled: "Power Supply and Plasma Display Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

"Wall charges" described herein mean charges formed and accumulated on a wall, e.g., a dielectric layer, close to an electrode of a discharge cell. A wall charge may be described as being "formed on" or "accumulated on" the electrode, although the wall charges may not actually touch the electrode. Further, a "wall voltage" means a potential difference formed on the wall of the discharge cell by the wall charge.

Where an element is described as being coupled to a second element, the element may be directly coupled to the second element, or may be indirectly coupled to the second element via one or more other elements. Further, where an element is described as being coupled to a second element, it will be understood that the elements may be electrically coupled, e.g., in the case of transistors, capacitors, power sources, nodes, etc. Where two or more elements are described as being coupled to a node, the elements may be directly coupled to the node, or may be coupled via conductive features to which the node is common. Thus, where embodiments are described or illustrated as having two or more elements that are coupled to a common point, it will be appreciated that the elements may be coupled to respective points on a conductive feature that extends between the respective points. Like reference numerals refer to like elements throughout.

As described herein, example embodiments are directed to a power supply configured to adjust a voltage for driving a PDP so as to maintain a stable discharge in the PDP, and a plasma display including the power supply.

FIG. 1 illustrates a schematic view of a plasma display having a power supply according to an example embodiment.

Referring to FIG. 1, the plasma display may include a plasma display panel (PDP) 100, a controller 200, an address electrode driver 300, a scan electrode driver 400, a sustain electrode driver 500, and a power supply 600.

The PDP 100 may include a plurality of address electrodes (A1 to Am) extending in a column direction, and a plurality of sustain electrodes (X1 to Xn) and scan electrodes (Y1 to Yn) extending in a row direction. Each sustain electrode may be paired with a scan electrode, such that the sustain electrodes X1 to Xn are formed corresponding to the scan electrodes Y1 to Yn, respectively. The sustain electrodes and scan electrodes may perform a display operation for displaying an image during the sustain period. The sustain electrodes and the scan electrodes may cross the address electrodes, and discharge spaces may be located at intersections of the address electrodes with the sustain and scan electrodes. A magnesium oxide (MgO) layer may be formed in the discharge cells.

The controller 200 may receive an externally-supplied video signal, and may output an address electrode driving control signal, a sustain electrode driving control signal, and a scan electrode driving control signal. The controller 200 may drive frames divided into a plurality of subfields, and each subfield may include a reset period, an address period, and a sustain period.

The controller 200 may accumulate a driving time of the PDP 100, e.g., by counting the driving time, and may output a control signal to the power supply 600, which may be used by the power supply 600 to control an output voltage Vout generated by the power supply 600. The control signal may indicate when an accumulated driving time S is greater than a predetermined reference time Sn.

In another implementation, the output voltage Vout is controlled according to a temperature T1 of the PDP 100 and/or an ambient temperature T2 of the PDP 100, where the ambient temperature T2 is the temperature of the surrounding environment, e.g., the temperature of a room in which the plasma display is located.

The address electrode driver 300 may receive the address electrode driving control signal from the controller 200, and may provide a display data signal to the address electrodes for selecting discharge cells in which an image will be displayed.

The scan electrode driver 400 may receive the scan electrode driving control signal from the controller 200, and may provide a driving voltage to the scan electrodes.

The sustain electrode driver 500 may receive the sustain electrode driving control signal from the controller 200, and may provide a driving voltage to the sustain electrodes.

The power supply 600 may generate a plurality of voltages used by the plasma display, and may output the generated voltages to the respective electrode drivers 300, 400, and 500. The respective electrode drivers 300, 400, and 500 may provide the voltages supplied from the power supply 600 to the respective electrodes, i.e., the scan, sustain, and address electrodes, of the PDP 100 to drive them.

The power supply 600 may be a switching mode power supply. The power supply 600 may alter one or more of the voltages generated thereby and supplied to the respective electrode drivers 300, 400, and 500 according to the accumulated driving time of the PDP 100.

Example driving waveforms of the plasma display shown in FIG. 1 will now be described with reference to FIG. 2. For convenience of description, only driving waveforms applied to a scan electrode ("Y electrode"), a sustain electrode ("X electrode"), and an address electrode ("A electrode") corresponding to a single discharge cell will be described, although it will be appreciated that all of the discharge cells may be similarly driven.

Figure 2:
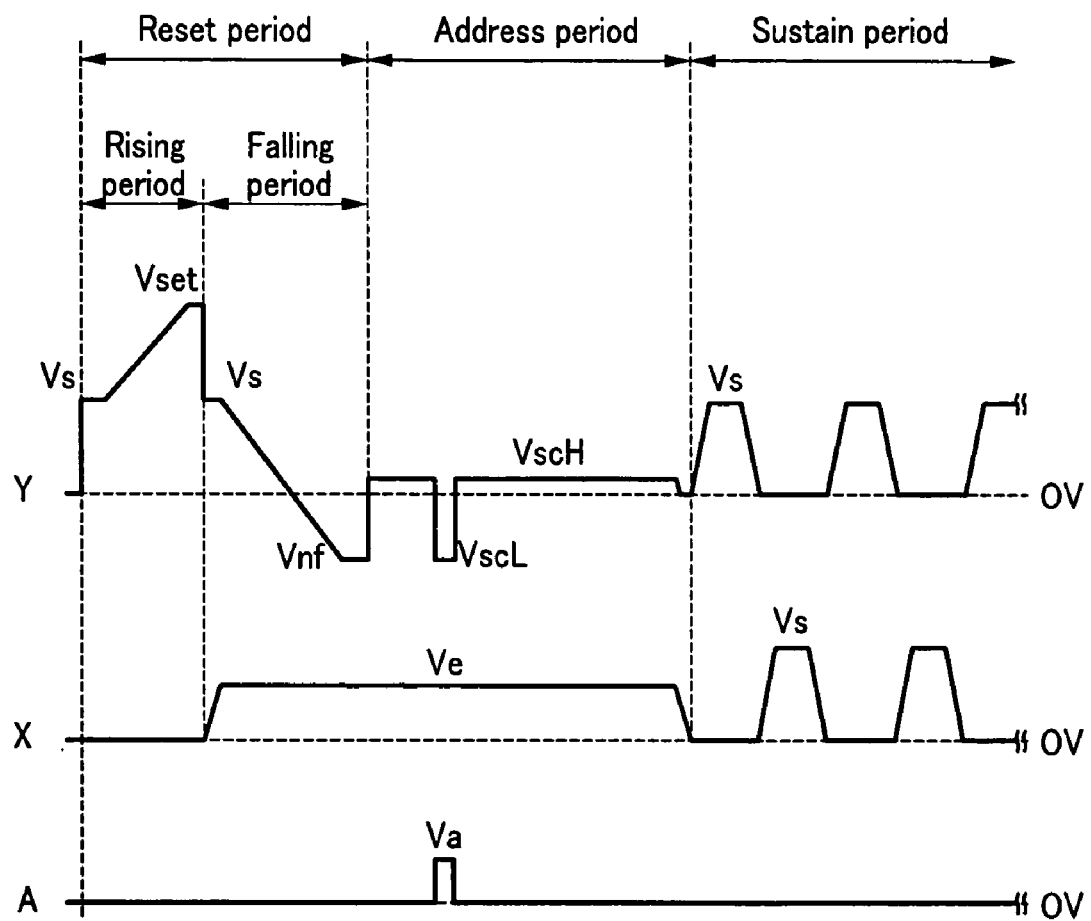
FIG. 2 illustrates a diagram of driving waveforms of the plasma display shown in FIG. 1.

Referring to FIG. 2, during a rising period of the reset period, voltages of the A and X electrodes may each be maintained at a reference voltage. For convenience of description, the reference voltage will be described as a ground voltage that is equal to 0 V. During the rising period of the reset period, a voltage of the Y electrode may be gradually increased from a (+) voltage Vs to a (+) voltage Vset. As a result, a weak discharge may be generated between the Y and X electrodes, and between the Y and A electrodes, while the voltage at the Y electrode increases, such that (−) wall charges are formed on the Y electrode and (+) wall charges are formed on the X and A electrodes.

At the start of a falling period of the reset period, the voltage of the Y electrode may be sharply decreased from the (+) voltage Vset to a (+) voltage Vs. During the falling period of the reset period, the voltage of the A electrode may again be maintained at the reference voltage, and the voltage of the X electrode may be increased to a (+) voltage Ve. During the falling period of the reset period, the voltage of the Y electrode may be gradually decreased from the (+) voltage Vs to a (−) voltage Vnf. As a result, a weak discharge may be generated between the Y and X electrodes, and between the Y and A electrodes, while the voltage of the Y electrode decreases, thereby eliminating the (−) wall charges previously formed on the Y electrode, and the (+) wall charges previously formed on the X and A electrodes.

A voltage difference (Ve−Vnf) between the X electrode and the Y electrode may be close to a discharge firing voltage Vfxy. As a result, a wall voltage between the Y and X electrodes may become close to 0V. Accordingly, when an address discharge is generated in the cell during the address period, the cell may be prevented from misfiring during the sustain period.

During the address period, to select the discharge cell as a turn-on discharge cell, i.e., a cell that is to emit light, a scan pulse having a voltage VscL may be applied to the Y electrode while the Ve voltage is applied to the X electrode (the scan pulse having the voltage VscL may be sequentially applied to the plurality of Y electrodes in the PDP 100). Also during the address period, a voltage Va may be applied to the A electrode (the address signal having the voltage Va may be applied to each turn-on discharge cell of the plurality of discharge cells corresponding to the Y electrode receiving the VscL voltage and the X electrode). Accordingly, during the address period, an address discharge may be generated between the A electrode receiving the voltage Va and the Y electrode receiving the voltage VscL, and between the Y electrode receiving the VscL voltage and the X electrode receiving the Ve voltage. As a result, (+) wall charges may be formed on the Y electrode, and (−) wall charges may be formed on the A electrode and the X electrode.

For turn-off discharge cells, i.e., cells that are not to emit light, different voltages than those described above may be applied during the address period. For example, a (+) voltage VscH that is higher than the (−) voltage VscL may be applied to the Y electrode, and the voltage VscL voltage may not be applied thereto. Further, the reference voltage may be applied to the A electrode.

To perform the above-described operations during the address period, the scan electrode driver 400 may select the Y electrode to which the scan pulse having the VscL voltage is applied from among the Y electrodes Y1 to Yn. For example, the Y electrode may be selected in a vertical direction in the single driving method. When one Y electrode is selected, the address electrode driver 300 may select a turn-on discharge cell from among the discharge cells corresponding to the Y electrode. Thus, the address electrode driver 300 may select a cell to which the address pulse having the voltage Va is applied from among the A electrodes.

The sustain period may follow the address period. During the sustain period, a sustain pulse alternately having a high level voltage, e.g., the (+) voltage Vs, and a low level voltage, e.g., the ground voltage (0 V), may be applied to the Y and X electrodes, and the sustain pulse applied to the Y electrode may have an opposite phase to the signal applied to the X electrode. The application of the voltage Vs to the Y electrode and the application of the 0 V voltage to the X electrode may generate a sustain discharge between the Y electrode and the X electrode, in which (−) wall charges are formed on the Y electrode and (+) wall charges are formed on the X electrode. The alternating phases of the sustain pulses may then move the wall charges between the Y and X electrodes. The operation of applying the sustain pulse to the Y electrode and the X electrode may be repeated a number of times corresponding to a weight value of the corresponding subfield.

In the PDP 100, characteristics of the MgO layer may change over time such that the voltage required to initiate a discharge decreases as the driving time of the PDP 100 increases. Accordingly, when the accumulated driving time of the PDP 100 exceeds a predetermined reference time, the voltage output from the power supply 600 may be adjusted to account for the change in the discharge firing voltage. In an implementation, the reference time may be equal to a point in time at which the discharge firing voltage starts to decrease. By adjusting the voltage output from the power supply 600 to compensate for changes in the discharge firing voltage, a stable discharge operation may be performed.

Figure 3:
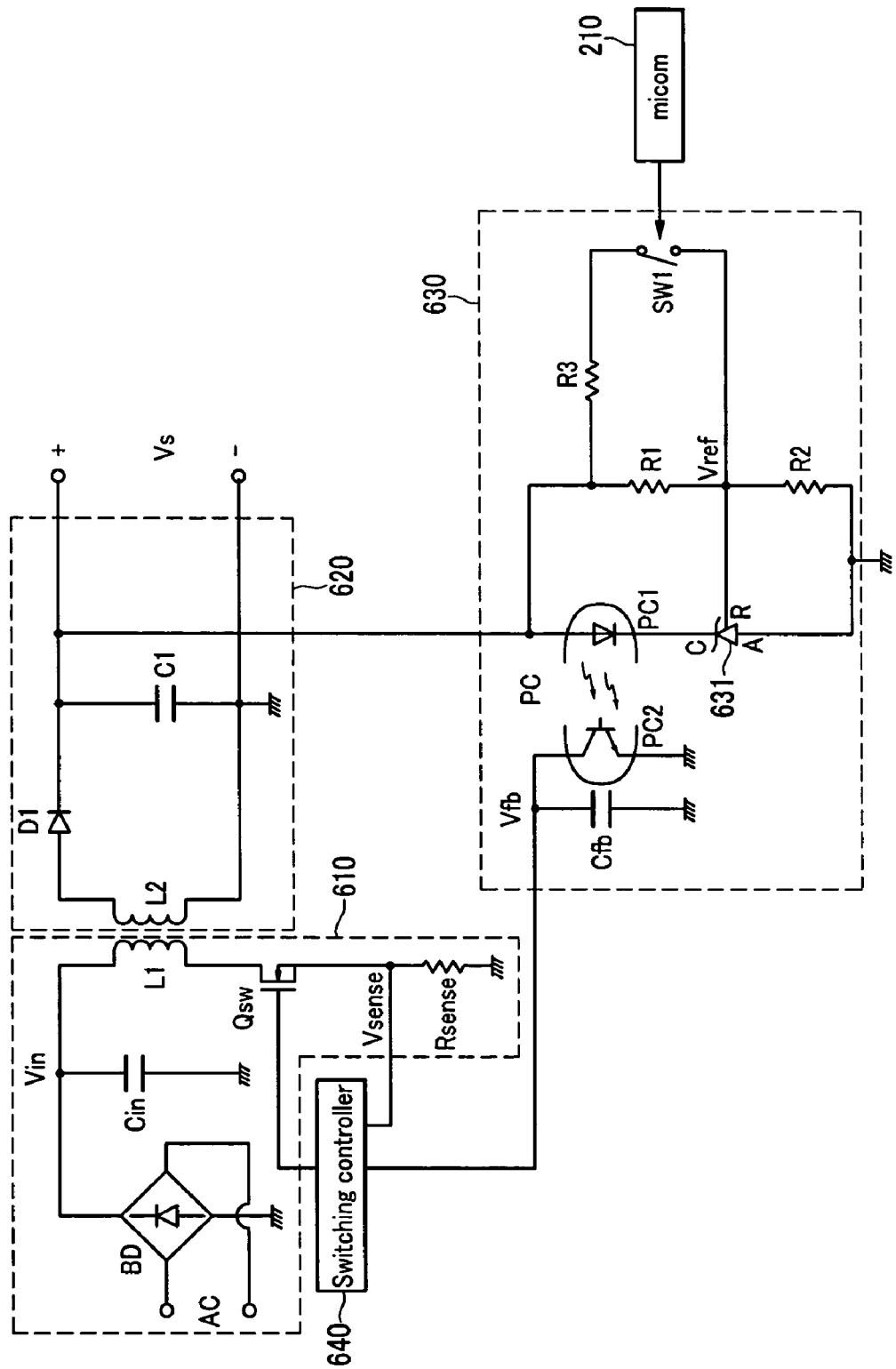
FIG. 3 illustrates a schematic diagram of a DC-DC converter with a feedback circuit in the power supply of the PDP shown in FIG. 1.

The structure and operation of the power supply 600, which may control one or more output voltages according to the driving time of the PDP 100, will be described with reference to FIG. 3. FIG. 3 illustrates a schematic diagram of DC-DC converter with a feedback circuit in the power supply of the PDP shown in FIG. 1. In FIG. 3, for better understanding and ease of description, only one direct current-direct current (DC-DC) converter, for generating the Vs voltage, is illustrated. It will be understood, however, that the structure and operation of the DC-DC converter may be applied to a plurality of DC-DC converters in the power supply 600, e.g., DC-DC converters configured to provide other voltages of the waveforms illustrated in FIG. 2.

Referring to FIG. 3, the power supply 600 may include a power supply circuit 610, an output circuit 620, a feedback circuit 630, and a switching controller 640.

The power supply circuit 610 may include a bridge diode BD, a capacitor Cin, a primary coil L1 of a transformer, a main switch Qsw, and a sensing resistor Rsense. The bridge diode BD may be coupled to an alternating current (AC) input and may rectify the input AC voltage. An output terminal of the bridge diode BD may be coupled to the primary coil L1. The capacitor Cin may be coupled between ground and a node between, i.e., common to, the bridge diode BD and the primary coil L1, in order to smooth the voltage rectified by the bridge diode BD. The primary coil L1 may be coupled between an input power source Vin from the bridge diode BD and the main switch Qsw, and the main switch Qsw may be coupled between the primary coil L1 and the sensing resistor Rsense. The sensing resistor Rsense may be coupled between the main switch Qsw and ground, and may be used to sense a current flowing through the main switch Qsw. The main switch Qsw is shown in FIG. 3 as a metal oxide semiconductor field effect transistor, but it will be appreciated that the main switch Qsw may be implemented using another switching element having the same function. In the power supply circuit 610, power flowing from the input power source Vin through the primary coil L1 may be controlled by the duty cycle of the main switch Qsw.

The output circuit 620 may include a secondary coil L2 of the transformer, which is electromagnetically coupled to the primary coil L1. Thus, the power supply circuit 610 may supply power to the output circuit 620 on the secondary side of the transformer. The output circuit may also include a diode D1 and a capacitor C1. An anode terminal of the diode D1 may be coupled to the secondary coil L2 of the transformer, and the capacitor C1 may be coupled between a cathode terminal of the diode D1 and ground. A voltage across both terminals of the capacitor C1 may be the voltage output from the power supply circuit 610, e.g., the voltage Vs.

The power supply 600 may be configured to transmit the output voltage Vs as a feedback voltage and control the duty cycle of the main switch Qsw using the feedback voltage so as to regulate the level of the output voltage, e.g., to regulate the level of the voltage Vs. The feedback may be provided by the feedback circuit 630.

The feedback circuit 630 may include first, second and third resistors R1, R2, and R3, respectively, as well as a switch SW1, a shunt regulator 631, a photo coupler PC, and a capacitor Cfb.

The resistor R1 and the resistor R2 may be coupled in series between ground and the cathode terminal of the diode D1 of the output circuit 620. In FIG. 3, the resistors R1 and R2 are each illustrated as a single resistor. In other implementations (not shown), the resistor R1 may be formed of a plurality of resistors coupled in series, or variable resistors may be used for the resistors R1 and R2.

One terminal of the resistor R3 may be coupled to a node common to the cathode terminal of the diode D1 and the resistor R1. Another terminal of the resistor R3 may be coupled to a terminal the switch SW1, such that the switch SW1 controls whether the resistor R3 is active in the feedback circuit 630. Another terminal of the switch SW1 may be coupled to a node common to the resistors R1 and R2. The on/off state of the switch SW1 may be set by the control signal from the controller 200, e.g., using a microcomputer (micom) 210 included in the controller 200.

The micom 210 may count the accumulated driving time S of the PDP 100. The micom 210 may also compare the accumulated driving time S and the predetermined reference time Sn. In an implementation, when the accumulated driving time S is greater than the reference time Sn, the micom 210 may turn on the switch SW1 of the feedback circuit 630. When the accumulated driving time S is less than the reference time Sn, the micom 210 may turn off the switch SW1. If the accumulated driving time S is equal to the reference time Sn, the micom 210 may turn on the switch SW1 or, alternatively, turn off the switch SW1.

The photocoupler PC in the feedback circuit 630 may include a photo diode PC1 and a phototransistor PC2 that is optically coupled to the photo diode PC1. An anode terminal of the photo diode PC1 may be coupled to a node that is common to the capacitor C1 of the output circuit 620 and the (+) terminal of the output circuit 620, and a cathode terminal of the photo diode PC1 may be coupled to a cathode terminal C of the shunt regulator 631. A terminal of the photo transistor PC2 may be coupled to a node common to a first terminal of a capacitor Cfb and the switching controller 640, and another terminal of the photo transistor PC2 may be coupled to ground. A second terminal of the capacitor Cfb may be coupled to ground.

A reference terminal R of the shunt regulator 631 may be coupled to the node common to the resistor R1 and the resistor R2, the cathode terminal C of the shunt regulator 631 may be coupled to the cathode terminal of the photo diode PC1, and the anode terminal of the shunt regulator 631 may be coupled to ground. The shunt regulator 631 may be an integrated circuit (IC), and elements such as TL431 (available from, e.g., Texas Instruments) and Ka431 (available from, e.g., Fairchild Semiconductor) may be used for the shunt regulator 631.

The reference terminal R of the shunt regulator 631 may be supplied with a reference voltage Vref. When the switch SW1 is turned off, the reference voltage Vref is given by Equation 1, below. Equation 1 reflects the relationship between the reference voltage Vref and the output voltage Vout, e.g., Vs, and the voltage distribution, i.e., the divided voltage, of the resistors R1 and R2, to which the reference terminal R of the shunt regulator 631 is commonly connected.

$$Vref = \left(\frac{R2}{R1 + R2}\right) \times Vs \qquad \text{[Equation 1]}$$

When the switch SW1 is turned on, e.g., when the accumulated driving time S of the PDP 100 is greater than the reference time Sn, the reference voltage Vref is given by Equation 2. Equation 2 reflects the relationship between the reference voltage Vref and the output voltage Vs illustrated in FIG. 3 when resistors R1 and R3 are coupled in parallel.

$$Vref = \left(\frac{R2}{R1 // R3 + R2}\right) \times Vs \qquad \text{[Equation 2]}$$

In Equation 2, R1//R3 signifies (R1×R3)/(R1+R3), such that the denominator is ((R1×R3)/(R1+R3))+R2.

In the feedback circuit 630 described above, the reference voltage Vref is input to the reference terminal R of the shunt regulator 631, and the reference voltage Vref varies according to the output voltage Vs. Accordingly, the amount of current flowing to the photo diode PC1 varies, and a feedback voltage Vfb transmitted to the switching controller 640 through the photo transistor PC2 also varies. The switching controller 640 receives the feedback voltage Vfb corresponding to the output voltage Vs and receives a sensing voltage Vsense detected by the sensing resistor Rsense from the feedback circuit 630, and determines the on/off state, i.e., the duty cycle, of the main switch Qsw.

An operation of the power supply 600 having the structure shown in FIG. 3 will now be described.

The output voltage Vs output from the output circuit 620 may be determined by the duty cycle of the main switch Qsw that is coupled to the primary coil L1 of the transformer. Thus, the duty cycle of the main switch Qsw may be determined by a signal transmitted to a gate terminal thereof from the feedback circuit 630, and the amount of current flowing through a drain and source of the main switch Qsw may be determined by the duty cycle. A voltage corresponding to the amount of current flowing through the main switch Qsw may be transmitted to the output circuit 620 through the transformer. As a result, the output circuit 620 may output the output voltage, e.g., Vs, to the respective electrode drivers 300, 400, and 500 in correspondence with the voltage transmitted to the secondary coil L2 of the transformer.

In addition, the voltage Vs output from the output circuit 620 may be transmitted by the feedback circuit 630 as a feedback voltage, and the feedback circuit 630 may output a signal to the switching controller 640 for controlling the duty cycle of the main switch Qsw based on the feedback voltage. Further, the switch SW1 of the feedback circuit 630 may be turned on/off according to the accumulated driving time S of the PDP 100.

When the accumulated driving time S is greater than the predetermined reference time Sn, the micom 210 may turn on the switch SW1. Accordingly, the reference voltage Vref of the shunt regulator 631 may be increased according to Equation 2, above.

When the reference voltage Vref is increased, the amount of current flowing in the photo transistor PC2 may be decreased according to the photo diode PC1, and the feedback voltage Vfb charged in the capacitor Cfb may be increased. The switching controller 640 may thus change the duty cycle of the main switch Qsw according to the feedback voltage Vfb to decrease the output voltage, e.g., Vs of the output circuit 620.

Figure 4:
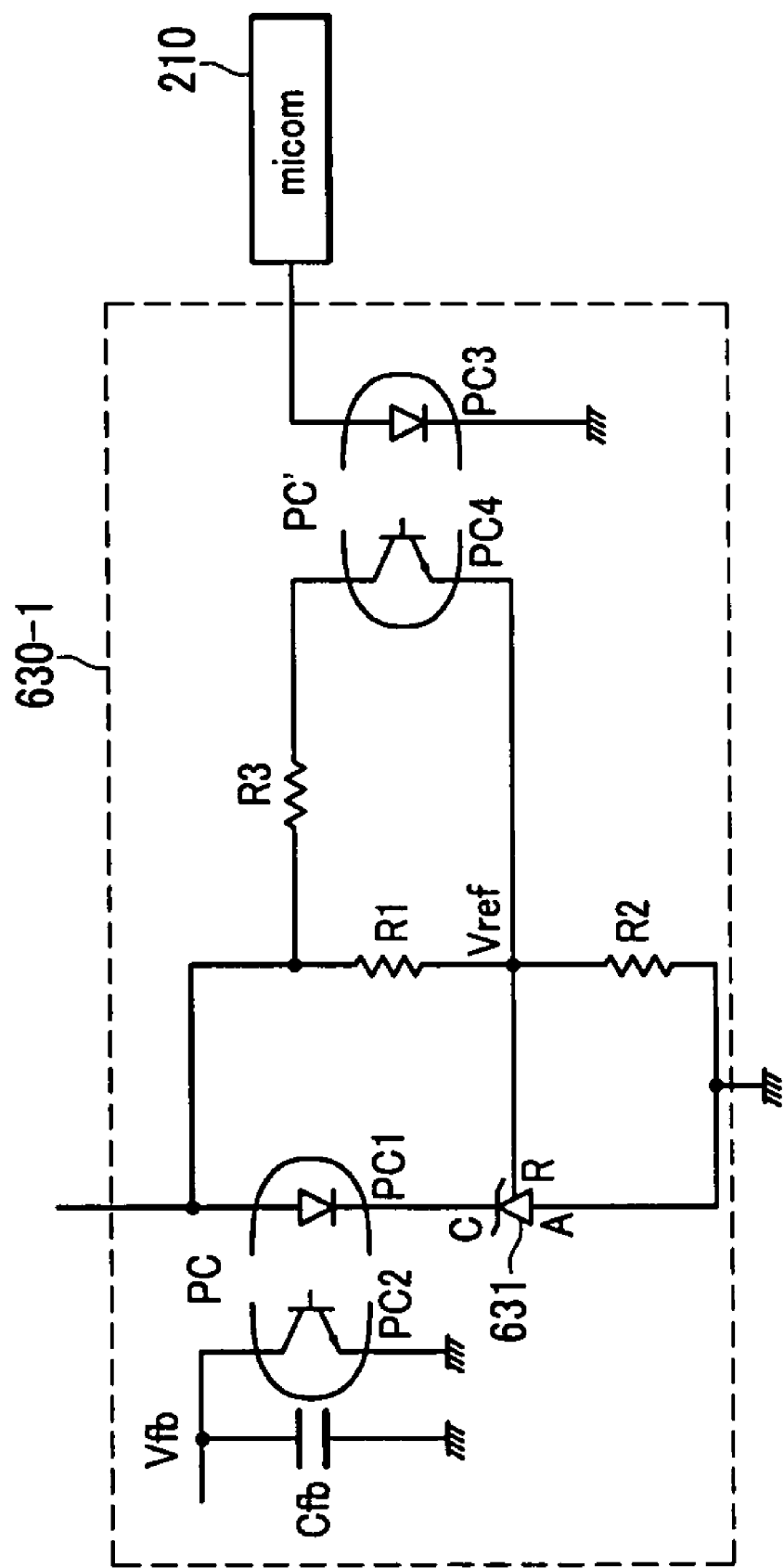
FIG. 4 illustrates a schematic diagram of a feedback circuit in the power supply according to another example embodiment.

FIG. 4 illustrates a schematic diagram of a feedback circuit 630-1 in the power supply 600 according to another example embodiment. Referring to FIG. 4, the second feedback circuit 630-1 may be similar to the feedback circuit 630, except that a second photo coupler PC' may be substituted for the switch SW1 illustrated in FIG. 3. In the description of the feedback circuit 630-1, the description of elements that are the same as those in the feedback circuit 630 may not be repeated.

In the feedback circuit 630-1, the photo coupler PC' may include a photo diode PC3 coupled between the micom 210 and ground, and may also include a photo transistor PC4 having a first terminal coupled to the resistor R3 and a second terminal coupled to a node common to the resistors R1 and R2. When the micom 210 outputs an on-signal, a current may be applied to the photo diode PC3, which may turn on the photo transistor PC4 and place the third resistor R3 in parallel with the first resistor R1. When the micom 210 outputs an off-signal, no current may be applied to the photo diode PC3 and the photo transistor PC4 may be turned off. When the photo transistor PC4 is turned on/off, the feedback circuit 630-1 may operate in the same manner as described above in connection with turning on/off the switch SW1 in the feedback circuit 630. Accordingly, the output voltage Vout, e.g., Vs, may vary according to the on/off state of the photo coupler PC'.

As described above, a time at which the discharge firing voltage is to be reduced as the accumulated running time of the PDP 100 elapses is determined. By reducing the output voltage Vs output from the power supply 600 corresponding to the point of time when the discharge firing voltage starts to be reduced, over-discharge or misfiring of discharge cells in the PDP 100 may be reduced or prevented.

In addition to the embodiments described above, or as an alternative thereto, the output of the DC-DC converter may be adjusted according to temperature as described below, since the discharge in the PDP 100 may be affected by temperature. For example, when temperature decreases, charges in the PDP 100 may move slowly and a discharge speed may be reduced, and it may take a considerable time to accumulate wall charges. Accordingly, when the sustain discharge is generated by applying the Vs voltage during the sustain period, the sustain discharge may not be completely generated during the sustain period, such that a low discharge may be generated. Therefore, in an implementation, the output voltage Vs output from the power source 600 may be increased when temperature increases, and a low sustain discharge may be prevented.

In addition, when temperature increases, charges in the PDP 100 may move rapidly and a speed of the sustain discharges may increase. Accordingly the charges may be self-eliminated or dissipated into peripheral discharge cells. Accordingly, a low discharge may be generated because the wall charges are insufficiently accumulated during the sustain period. Therefore, in another implementation, when temperature decreases, the output voltage Vs output from the power source 600 may increase, and a low sustain discharge may be prevented.

In the following description, the resistor R1 may be implemented as a variable resistor, and the resistance of the resistor R1 may vary according to temperature to vary the output voltage Vs. In order to more clearly describe the operation of this embodiment, Equation 1 above may be rewritten to give Equation 3, below.

$$Vs = \left(1 + \frac{R1}{R2}\right) \times Vref \qquad \text{[Equation 3]}$$

In Equation 3, the voltage Vs may be varied according to variations in the resistance values of the resistors R1 and/or R2.

In an example embodiment, the value of the resistor R1 is varied according to the temperature of the PDP 100 or the ambient temperature of the PDP 100. Here, the variable resistor of which resistance varies according to temperature may be a generally known device, and therefore a detailed description thereof will be omitted. Since the variable resistor R1 may be provided in the power source 600, the value of the variable resistor R1 may not be directly varied according to the temperature of the PDP 100 or the ambient temperature of the PDP 100. However, the value of the variable resistor R1 may be indirectly varied according to the temperature of the PDP 100 or the ambient temperature of the PDP 100, since the temperature of the power source 600 may vary according to temperature of the PDP 100. Accordingly, the value of the variable resistor R1 may reflect the temperature of the PDP 100 or the peripheral temperature of the PDP 100, even where the variable resistor is positioned in the power source 600.

When the resistor R1 is set to have a positive temperature coefficient (PTC), in which a resistance value increases as the temperature increases, the output voltage Vs may be increase as the temperature increases, in accordance with Equation 3. In another implementation, when the resistor R1 is set to have a negative temperature coefficient (NTC), in which the resistance value increases as the temperature decreases, the output voltage Vs may increase as the temperature decreases, in accordance with Equation 3. Accordingly, depending on the implementation, a variable resistor R1 having a PTC or a NTC may be used, and the Vs voltage may be increased when the temperature increases or decreases, respectively.

In another example embodiment, the resistor R2 may be implemented as a variable resistor, and the output voltage Vs may be varied by varying a value of the resistor R2 according to temperature. If the resistor R2 is set to have a PTC, the value of the resistor R2 decreases as the temperature decreases and the output voltage Vs may increase as the temperature decreases, in accordance with Equation 3. In another implementation, if the resistor R2 is set to have a NTC, the value of the resistor R2 decreases when the temperature increases and the output voltage Vs may increase as the temperature increases, in accordance with Equation 3. Thus, in this embodiment, the resistor R2 may be a variable resistor having a PTC or a NTC, and the voltage Vs may increase when the temperature increases or decreases, respectively.

In another example embodiment, the resistors R1 and R2 may both be implemented as variable resistors. For example, the resistor R1 may have a PTC and the resistor R2 may have a NTC, such that the voltage Vs is increased as the temperature increases. In another example, the resistor R1 may have a NTC and the resistor R2 may have a PTC, such that the voltage Vs decreases as the temperature decreases.

In the example embodiments described herein, the voltage Vs may be varied according to the driving time, the temperature, and/or the ambient temperature of the PDP 100. However, embodiments are not limited to controlling only the voltage Vs, and one or more other voltages, e.g., Va, VscH, VscL, and Vnf, may be varied in addition to, or instead of, Vs.

As described herein, a power supply used to drive a plasma display, and a plasma display including the power supply, may vary an output voltage of the power supply according to the driving time of the plasma display. Thus, a stable discharge may be generated. In addition, the output voltage of the power supply may be varied according to the temperature of the PDP and/or the ambient temperature of the PDP. Thus, a low discharge may be reduced or prevented.

Example embodiments have been disclosed herein, and although specific terms are employed, they are used and are to be interpreted in a generic and descriptive sense only and not for purpose of limitation. For example, the details of the structure of the PDP described herein are provided merely as an example, and PDPs having different structures may be used with waveforms similar to those described herein. Accordingly, it will be understood by those of ordinary skill in the art that various changes in form and details may be made without departing from the spirit and scope of the present invention as set forth in the following claims.

What is claimed is:

1. A power supply for a plasma display panel (PDP), the power supply comprising:
   a transformer including a primary coil coupled to an input power source and a secondary coil coupled to an output terminal;
   a first switch coupled to the primary coil of the transformer, a duty cycle of the first switch controlling a voltage of the output terminal;
   first and second resistors coupled to the output terminal in series;
   a third resistor having a first terminal coupled to a node common to the output terminal and the first resistor;
   a second switch having a first terminal coupled to a second terminal of the third resistor and having a second terminal coupled to a node common to the first and second resistors, the second switch being controlled based on an accumulated driving time of the PDP; and
   a switching controller configured to receive a feedback voltage that varies according to an on/off state of the second switch, and configured to control the duty cycle of the first switch.

2. The power supply as claimed in claim 1, wherein:
   the first and third resistors are coupled in parallel when the second switch is turned on, and
   no current flows through the third resistor when the second switch is turned off.

3. The power supply as claimed in claim 1, further comprising:
   a shunt regulator having a reference terminal coupled to a node common to the first and second resistors and having an anode terminal coupled to ground;
   a photo diode having a cathode terminal coupled to the output terminal and having an anode terminal coupled to a cathode terminal of the shunt regulator;
   a photo transistor optically coupled to the photo diode; and
   a capacitor coupled in parallel to the photo diode or the photo transistor, the capacitor being charged with the feedback voltage.

4. The power supply as claimed in claim 1, wherein the second switch is a photo coupler.

5. The power supply as claimed in claim 1, wherein at least one of the first and second resistors is a variable resistor having a resistance value that varies according to temperature.

6. The power supply as claimed in claim 5, wherein the temperature corresponds to the temperature of the PDP or the ambient temperature of the PDP.

7. The power supply as claimed in claim 5, wherein the first resistor has a resistance value that increases as the temperature increases.

8. The power supply as claimed in claim 5, wherein the first resistor has a resistance value that increases as the temperature decreases.

9. The power supply as claimed in claim 5, wherein the second resistor has a resistance value that increases as the temperature decreases.

10. The power supply as claimed in claim 5, wherein the second resistor has a resistance value that increases as the temperature increases.

11. A plasma display, comprising:
    a plasma display panel (PDP) including first and second electrodes, and a discharge cell at an intersection of the first and second electrodes;
    a driver configured to drive at least one of the first and second electrodes;
    a power supply configured to provide a voltage to the driver; and
    a controller configured to accumulate a driving time of the PDP and control a voltage output by the power supply according to the accumulated driving time, wherein the power supply includes:
    a transformer including a primary coil coupled to an input power source and a secondary coil coupled to an output terminal;
    a first switch coupled to the primary coil of the transformer, a duty cycle of the first switch controlling a voltage of the output terminal;
    first and second resistors coupled to the output terminal in series;
    a third resistor having a first terminal coupled to a node common to the output terminal and the first resistor;
    a second switch having a first terminal coupled to a second terminal of the third resistor and having a second terminal coupled to a node common to the first and second resistors, the second switch being controlled based on an accumulated driving time of the PDP; and
    a switching controller configured to receive a feedback voltage that varies according to an on/off state of the second switch, and configured to control the duty cycle of the first switch.

12. The plasma display as claimed in claim 11, wherein the controller outputs a control signal for turning off the second switch when the accumulated driving time is less than a predetermined reference time, and outputs a control signal for turning on the second switch when the accumulated driving time is greater than the reference time.

13. The plasma display as claimed in claim 11, wherein:
    the first and third resistors are coupled in parallel when the second switch is turned on, and no current flows through the third resistor when the second switch is turned off.

14. The plasma display as claimed in claim 11, further comprising:
a shunt regulator having a reference terminal coupled to a node common to the first and second resistors and having an anode terminal coupled to ground;
a photo diode having a cathode terminal coupled to the output terminal and having an anode terminal coupled to a cathode terminal of the shunt regulator;
a photo transistor optically coupled to the photo diode; and
a capacitor coupled in parallel to the photo diode or the photo transistor, the capacitor being charged with the feedback voltage.

15. The plasma display as claimed in claim 11, wherein the second switch is a photo coupler.

16. The plasma display as claimed in claim 11, wherein at least one of the first and second resistors is a variable resistor having a resistance value that varies according to temperature.

17. The plasma display as claimed in claim 16, wherein the temperature corresponds to the temperature of the PDP or the ambient temperature of the PDP.

18. The plasma display as claimed in claim 16, wherein the first resistor has a resistance value that increases as the temperature increases.

19. The plasma display as claimed in claim 16, wherein the first resistor has a resistance value that increases as the temperature decreases.

20. The plasma display as claimed in claim 16, wherein the second resistor has a resistance value that increases as the temperature decreases.

21. The plasma display as claimed in claim 16, wherein the second resistor has a resistance value that increases as the temperature increases.

* * * * *